Feb. 8, 1966   B. G. WOLFORD ETAL   3,233,813
PIE PLATE RECEPTACLE WITH STEPPED FLANGE
Filed July 31, 1963   4 Sheets-Sheet 1

INVENTORS.
BYRON G. WOLFORD
JAMES BERNARD YOSS
BY
*Glenn Palmer*
*Matthews*
THEIR ATTORNEYS Feb. 8, 1966 B. G. WOLFORD ETAL 3,233,813
PIE PLATE RECEPTACLE WITH STEPPED FLANGE
Filed July 31, 1963 4 Sheets-Sheet 2

INVENTORS
BYRON G. WOLFORD
JAMES BERNARD YOSS
BY
Glenn, Palmer
& Matthews
THEIR ATTORNEYS

INVENTORS
BYRON G. WOLFORD
JAMES BERNARD YOSS

THEIR ATTORNEYS

Feb. 8, 1966  B. G. WOLFORD ETAL  3,233,813
PIE PLATE RECEPTACLE WITH STEPPED FLANGE
Filed July 31, 1963  4 Sheets-Sheet 4

INVENTORS
BYRON G. WOLFORD
JAMES BERNARD YOSS
BY
THEIR ATTORNEYS

United States Patent Office 3,233,813
Patented Feb. 8, 1966

3,233,813
PIE PLATE RECEPTACLE WITH STEPPED FLANGE
Byron G. Wolford and James Bernard Yoss, Chesterfield County, Va., assignors to Reynolds Metals Company, Richmond, Va., a corporation of Delaware
Filed July 31, 1963, Ser. No. 299,012
10 Claims. (Cl. 229—3.5)

This invention relates to an improved cup-shaped receptacle, such as a metallic foil pie plate or the like, as well as to an improved method and apparatus for making the same or the like.

It is well known that frozen pies and the like are normally merchandised in metallic foil pie plates or the like so that the ultimate consumer can subsequently bake the pie directly in its packaged pie plate.

However, in order to make such foil pie plate of sufficient strength, it has been necessary in the past to utilize a relatively thick metallic foil whereby the resulting pie plate is not economical.

Therefore, pie plate manufacturers have been striving to strengthen the pie plate structure in such a manner that a thinner gage of metallic foil can be utilized while still providing the desired structural strength for the pie plate.

Accordingly, it is an object of this invention to provide an improved cup-shaped receptacle or the like having improved structural strength over prior known cup-shaped receptacles or the like, the receptacle of this invention having one or more of the novel features hereinafter shown or described.

Another object of this invention is to provide an improved method of making such a receptacle or the like.

A further object of this invention is to provide an improved apparatus for making such a receptacle or the like.

Other objects, uses and advantages of this invention are apparent from a reading of this description, which proceeds with reference to the accompanying drawings forming a part thereof and wherein:

FIGURE 6 is a schematic view illustrating one method for testing the strength of a cup-shaped receptacle or the like.

Figure 1:
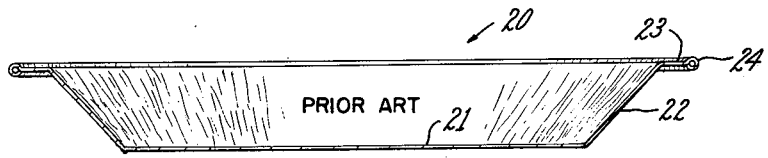
FIGURE 1 is a cross-sectional view of a prior art receptacle.

While the various features of this invention are hereinafter described and illustrated as being particularly adaptable for providing a pie plate receptacle or the like, it is to be understood that the various features of this invention can be utilized singly or in any combination thereof to provide other receptacles as desired.

Therefore, this invention is not to be limited to only the embodiments illustrated in the drawings, because the drawings are merely utilized to illustrate one of the wide variety of uses of this invention.

Referring now to FIGURE 1, a prior cup-shaped receptacle, such as a metallic foil pie plate or the like, is generally indicated by the reference numeral 20 and is formed from a sheet of metallic foil, such as aluminum-containing metallic foil or the like, by suitable drawing apparatus to define a flat bottom wall means 21 and outwardly slanting side wall means 22 integrally interconnected to the bottom wall means 21 and having an outwardly directed substantially horizontal peripheral flange 23 terminating at its outer edge means in an annular reinforcing bead 24.

Figure 6:
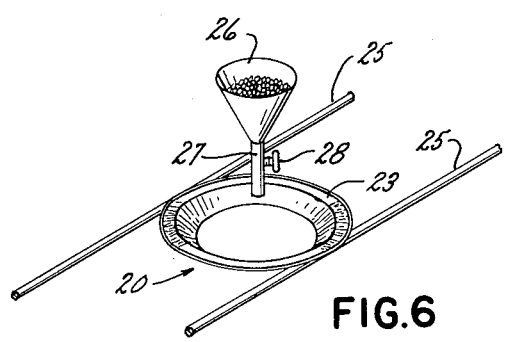

Since such pie plates 20 are normally suspended by the peripheral flanges 23 thereof by conventional pie filling machinery or the like, such prior art receptacle 20 was tested in the manner illustrated in FIGURE 6.

In particular, the under surface of the peripheral flange 23 of the receptacle 20 was placed on a pair of parallel bars 25 so that the receptacle 20 was completely suspended at two points by its peripheral flange 23.

A funnel 26, containing six pounds of No. 12 lead shot or the like and having approximately a quarter of an inch aperture at the apex thereof, is interconnected to a two-inch length of three-sixteenths of an inch internal diameter rubber tubing adapted to be closed by a pinch clamp 28.

The funnel 26 was centered above the parallel bars 25 and fixed in such a position as to allow the shot to fall two inches from the end of the tubing 27 to the bottom of the receptacle 20.

When the prior art receptacle 20 was made of .0035 of an inch thick aluminum-containing metallic foil, it was found that the receptacle 20 had one rim thereof lose contact with its supporting parallel bar 25 when only approximately one pound and fourteen ounces of shot had been dropped into the receptacle 20.

In order to increase the structural strength of the peripheral flange 23 of the receptacle 20, it was found that if the peripheral flange 23 were angled slightly downwardly, the same had increased structural strength.

Figure 2:
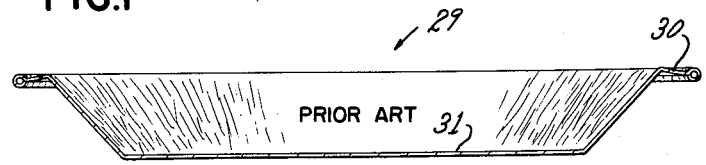
FIGURE 2 is a view similar to FIGURE 1 and illustrates another prior art receptacle.

For example, such a prior art container is generally indicated by the reference numeral 29 in FIGURE 2 wherein the peripheral flange 30 thereof is angled downwardly in a direction toward the bottom wall means 31 thereof.

However, when such a prior art receptacle 29 was tested in the manner illustrated in FIGURE 6 and was formed of .0035 of an inch thick aluminum-containing foil, the peripheral flange 30 thereof was only adapted to support approximately two pounds and eight ounces of shot.

However, by following the teachings of this invention, an improved receptacle can be formed of the same .0035 of an inch thick aluminum-containing foil and be adapted to support approximately four pounds and one-half ounce of shot when tested in the manner illustrated in FIGURE 6 whereby it can be seen that the improved container of this invention has greatly increased structural strength over the prior art containers even though the same is made of the same gauge of metallic foil.

Figure 3:
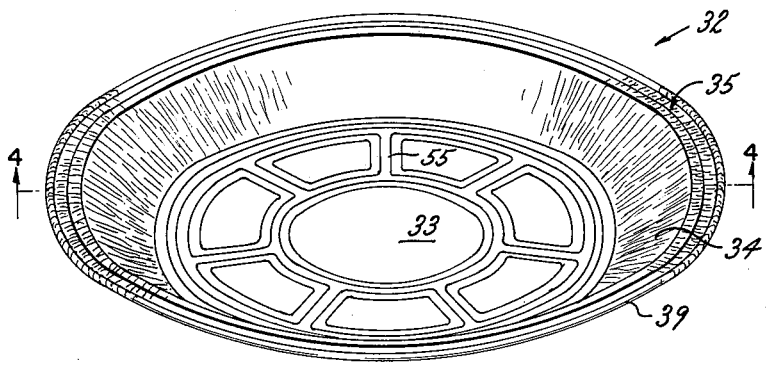
FIGURE 3 is a top perspective view illustrating the improved receptacle of this invention.
Figure 4:
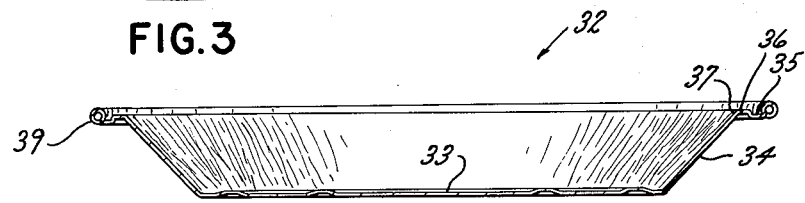
FIGURE 4 is a cross-sectional view taken on line 4—4 of FIGURE 3.
Figure 5:
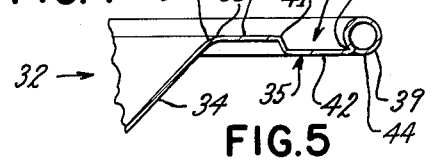
FIGURE 5 is an enlarged, fragmentary, cross-sectional view of the peripheral flange of the receptacle illustrated in FIGURE 4.

In particular, the improved cup-shaped receptacle of this invention is generally indicated by the reference numeral 32 in FIGURES 3–5 and comprises a substantially flat bottom wall means 33 integrally interconnected to a outwardly slanting side wall means 34 having an outwardly directed peripheral flange 35 interconnected at its inner edge means 36 to the top edge means 37 of the side wall means 34, the peripheral flange 35 having its outer edge means 38 terminating in an annular reinforcing bead 39.

Therefore, it can be seen that the improved container 32 of this invention is substantially identical to the container illustrated in FIGURE 1 except that the container 22 of this invention has improved structural strength over the prior art receptacle 20 because the peripheral flange 35 of the receptacle 32 of this invention has an annular groove means 40 formed therein to step the peripheral flange 35.

In particular, the substantially horizontal peripheral flange 35 of the receptacle 32 of this invention has an annular groove 40 formed therein which extends from the outer edge means 38 thereof to a point 41 disposed outboard of the inner edge means 36 thereof, the groove 40 having the open end thereof facing away from the bottom wall means 33. The groove 40 defines an end wall 42 which is disposed substantially parallel to the ungrooved portion 43 of the peripheral flange 35, the end wall 42 being substantially flat.

The annular bead 39, disposed at the outer edge means 38 of the peripheral flange 35, is so constructed and arranged that the bottom 44 thereof is disposed substantially in the same plane as the grooved portion 42 of the peripheral flange 35 of the receptacle 32.

By so grooving the peripheral flange 35 of the receptacle 32 of this invention, it can be seen that the resulting peripheral flange 35 has a vastly increased structural strength over the peripheral flange 23 of the prior art receptacle 20 as well as over the peripheral flange 30 of the prior art receptacle 29 of FIGURE 2 without requiring an angling of the peripheral flange 35 in the manner of the peripheral flange 30 previously described.

Such increased structural strength at the peripheral flange 35 of the receptacle 32 of this invention readily permits the receptacle 32 of this invention to be relatively roughly handled in pie filling apparatus without causing the same to buckle under stresses which would cause buckling of the prior art receptacles formed of the same gauge of metal.

Further, it can be seen that receptacles formed in accordance with the teachings of this invention can be formed with a thinner gauge of metallic foil to produce a peripheral flange having the same structural strength as the prior art containers when the prior art receptacles are formed of thicker gauges of metallic foil or the like and are, thus, more expensive than the receptacles of this invention.

The method and apparatus of this invention for forming the receptacle 32 is generally indicated by the reference numeral 45 in FIGURES 7-13 and will now be described.

Figure 7:
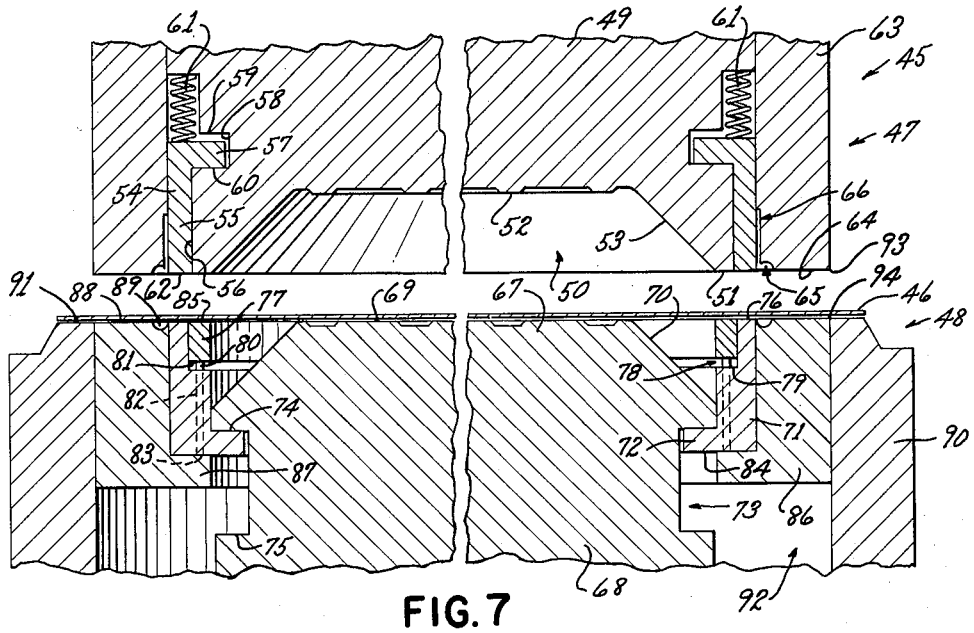
FIGURE 7 is a schematic cross-sectional view illustrating the apparatus of this invention.

As illustrated in FIGURE 7, a sheet of receptacle forming material 46, is adapted to be serially fed between cooperating die means 47 and 48 of the apparatus 45 of this invention in a conventional manner, the sheet of material 46 being adapted to have an unblanked portion thereof indexed inwardly into the drawing sheet having FIGURE 7 thereon.

The upper die means 47 of this invention includes an inner die member or former 49 having a cavity 50 interrupting the lower surface 51 thereof, the cavity 50 defining a substantially flat end wall 52 to form the bottom wall of the receptacle and an outwardly tapering side wall means 53 to define the slanting side walls of the receptacle 32 in a manner hereinafter described.

A step ring or outer die member 54 forms part of the die means 47 and has an annular portion 55 disposed in sliding engagement with the outer cylindrical peripheral surface 56 of the former 49, the step ring 54 having an inwardly directed flange 57 loosely received in an annular channel 58 formed in the former 49 and defining opposed shoulders 59 and 60 thereof.

Very light compression spring means 61 are disposed between the former 49 and the step ring 54 to tend to urge the step ring 54 downwardly until the flange 57 thereof abuts the shoulder 60 whereby the end surface 62 of the step ring 54 is disposed substantially flush with the end surface 51 of the former 49. However, the step ring 54 can be moved upwardly relative to the former 49 in opposition to the force of the compression spring means 61 until the flange 57 thereof abuts the shoulder 59 of the former 49 for a purpose hereinafter described.

The die means 47 of this invention includes an outer annular punch or bead forming member 63 disposed outside of the members 49 and 54 for a purpose hereinafter described, the bead forming member 63 having a lower surface 64 normally disposed in the same plane as the surfaces 62 and 51 of the members 54 and 49 in the manner illustrated in FIGURE 7 but being adapted to be moved relative thereto in a manner hereinafter described.

The end surface 64 of the bead forming member 63 has the inner peripheral edge thereof cut away to define a substantially semi-circular groove 65 for a purpose hereinafter described, the groove 65 being interconnected to an internal peripheral slot means 66 formed in the bead forming member 63 for a purpose hereinafter described.

The lower die means 48 of the apparatus 45 of this invention includes an inner member or former 67 held stationary in any suitable manner. For example, the lower portion 68 of the former 67 could be formed separately therefrom and comprise a lower riser block that can be secured to the upper part 67 thereof in any suitable manner or the upper and lower portions 67 and 68 can be formed integrally in the manner illustrated.

In any event, the former 67 has a substantially flat surface 69 adapted to cooperate with the surface 52 of the die means 47 to form the bottom of the receptacle 32 in a manner hereinafter described.

If desired, the surfaces 69 and 52 of the formers 67 and 49 can be suitably embossed to provide the desired embossing on the bottom of the receptacle 32 in the manner illustrated in FIGURE 3.

The former 67 of the die means 48 has an outwardly sloping side surface 70 adapted to cooperate with the surface 53 of the die means 47 to form the side wall means of the receptacle 32 in a manner hereinafter described.

An outer die member or draw ring 71 forms part of the die means 48 and is movable relative to the former 67, the draw ring 71 having an inwardly directed flange 72 receivable in an annular groove 73 formed in the former 67 and defining opposed shoulders 74 and 75 thereof.

In this manner, when the draw ring 71 is moved upwardly in a manner hereinafter described, upward movement thereof is limited by the shoulder 74 of the former 67 whereby when the draw ring 71 has been moved upwardly to its uppermost position, the upper surface 76 thereof is disposed in substantially the same plane as the upper surface 69 of the former 67 for a purpose hereinafter described.

Conversely, downward movement of the draw ring 71 relative to the former 67 is limited by the flange 72 of the draw ring 71 abutting the shoulder 75 thereof for a purpose hereinafter described.

The die means 48 includes a step ring or die member 77 disposed intermediate the inner die member 67 and the outer die member 71 and is received in an annular groove 78 formed in the draw ring 71, the groove 78 defining a shoulder 79 that limits downward movement of the step ring 77 relative to the draw ring 71 in a manner hereinafter described.

A plurality of push rods 80 are carried by the step ring 77 and project downwardly from the bottom surface 81 thereof through suitable apertures 82 formed through the draw ring 71, the rods 80 respectively having free ends 83 normally disposed flush with the end surface 84 of the draw ring 71 when the upper surface of the step ring 77 is disposed in the same plane as the end surfaces 76 and 69 of the members 71 and 67 for a purpose hereinafter described.

The die means 48 includes an outer draw ring or bead forming member 86 adapted to be moved relative to the other die members of the die means 48, the bead forming member 86 having an inwardly directed flange 87 adapted to engage the surface 84 of the draw ring 71 to prevent the step ring 77 from moving from the position illustrated in FIGURE 7 as the flange means 87 of the bead forming member 86 engages the ends 83 of the push rods 80 for a purpose hereinafter described. However, the bead forming member 86 is adapted to move downwardly beyond the shoulder 75 of the former 67 for a purpose hereinafter described.

When the bead forming member 86 is disposed in the position illustrated in FIGURE 7, the same has an upper surface 88 disposed in the same plane as the upper surfaces 76, 85 and 69 of the die members 71, 77 and 67 for a purpose hereinafter described.

The inner, upper, peripheral corner of the bead forming member 87 is provided with a substantially semi-circular groove 89 which is adapted to cooperate with the groove 65 of the upper bead forming member 63 to form the annular bead 39 of the receptacle 32 in a manner hereinafter described.

An outer blanking ring or die member 90 completes the die means 48 and is held stationary in the same manner as the former 67, the blanking ring 90 having an upper surface 91 disposed in the same plane as the upper surface 69 of the former 67 for a purpose hereinafter described.

The blanking ring 90 forms a cavity 92 with the former 67 whereby the cavity 92 can be supplied with suitable fluid under pressure in desired time sequence in a manner hereinafter described to hold all of the die parts 86, 71 and 77 in the position illustrated in FIGURE 7.

The operation of the apparatus and method 45 of this invention will now be described.

Assuming that an unblanked portion of the sheet of material 46 has been indexed between the opened die means 47 and 48 of the apparatus 45 in the manner illustrated in FIGURE 7, the upper die means 47 is progressively moved downwardly until the surfaces 51, 62 and 64 of the members 49, 54 and 63 thereof make the contact with the sheet of material 46 and compact the same against the surfaces 85, 76 and 88 of the die members 77, 71 and 86 of the lower die means 48 to cause movement thereof downwardly relative to the former 67. As the sheet of material 46 is moved downwardly, the outer peripheral edge 93 of the upper bead forming member 63 cooperates with the inner peripheral edge 94 of the blanking member 90 of the lower die means 48 to sever a circular blank 95 from the sheet of material 46 in the manner illustrated in FIGURE 8.

Figure 8:
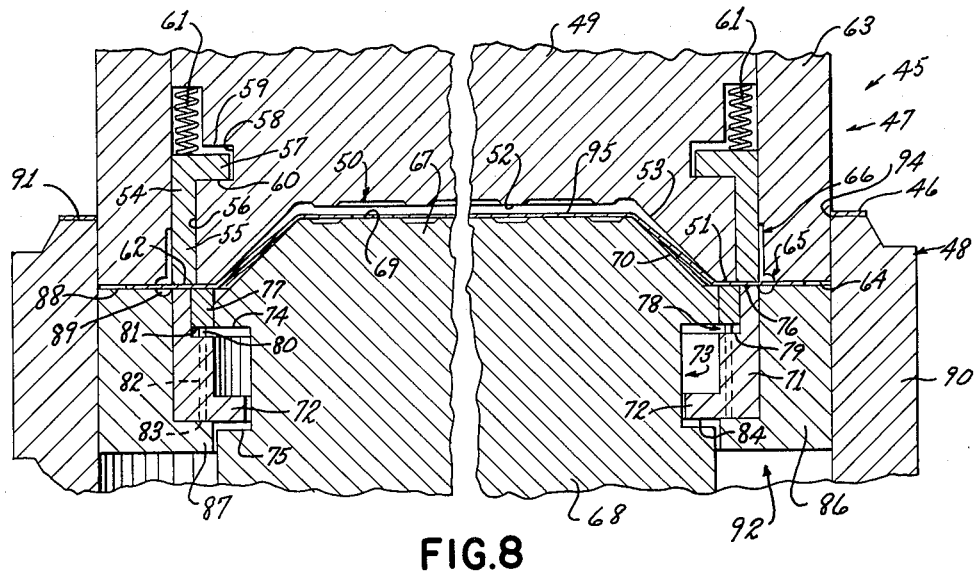
FIGURE 8 is a view similar to FIGURE 7 and illustrates the apparatus in another operating position thereof.

As illustrated in FIGURE 8, as the upper die parts 49, 54 and 63 of the upper die means 37 continue to move in unison in a downward direction relative to the former 67 to cause simultaneous movement of the die members 77, 71 and 86 of the lower die means 48 therewith, the upper former 49 and the lower former 67 begin to cooperate together to form the blank 95 in its cup-shaped configuration as illustrated in FIGURE 8 while the surface 51 of the die member 49 and surface 62 of the member 54 respectively cooperate with the surfaces 85 and 76 of the die members 77 and 71 to form the peripheral flange of the receptacle 32.

Figure 9:
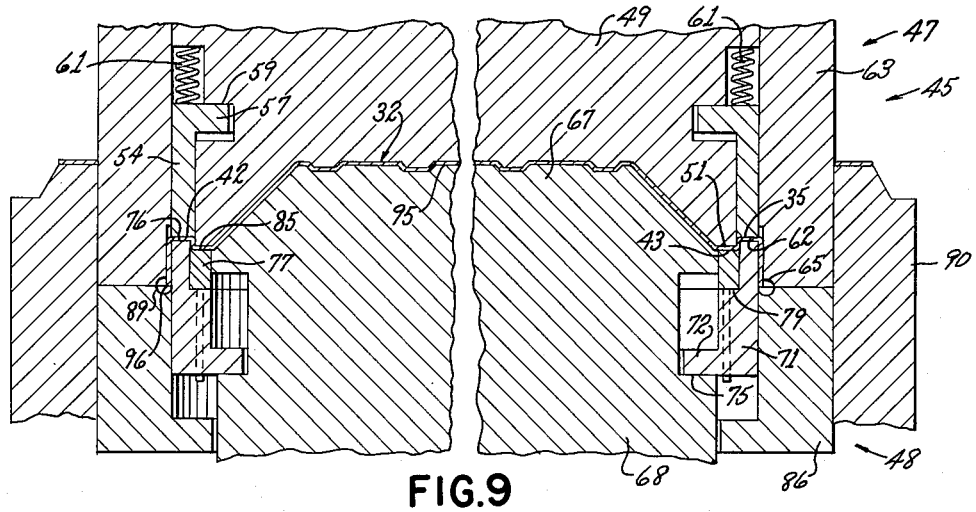
FIGURE 9 is a view similar to FIGURE 8 and illustrates the apparatus in another operating position thereof.

The die members 77 and 71 of the lower die means 48 are continued to be moved downwardly by the die members 49 and 54 of the upper die means 47 until the flange 72 of the die member 71 of the die means 48 abuts the shoulder 75 of the former 67 in the manner illustrated in FIGURE 9 whereby further movement of the die member 71 and the upper step ring 54 of the die means 48 and 47 is terminated. However, the upper die member 49 and bead forming member 63 thereof are adapted to further move downwardly to cause the die member 77 and bead forming member 86 of the die means 48 to move downwardly therewith until the die member 77 abuts against the shoulder 79 of the now stationary die member 71 in the manner illustrated in FIGURE 9 whereby the cooperating surfaces 51 and 85 of the die members 49 and 77 cooperate together to form the ungrooved portion 43 of the peripheral flange 35 of the receptacle 32 while the cooperating surfaces 76 and 62 of the die members 77 and 74 form the grooved portion 42 of the peripheral flange 35 of the receptacle 32 for a purpose previously described, the step ring 54 of the upper die means 47 permitting such relative movement between the die member 49 and itself by compressing the spring means 61 until the flange 57 thereof abuts the shoulder 59 of the former 49 in the manner illustrated in FIGURE 9.

At this time, that is, when the die member 77 is against the shoulder 79 of the die member 71 and the flange means 57 of the step ring 54 is against the shoulder 59 of the former 49, downward movement of the former 49 is terminated as the same has fully cooperated with the former 67 to complete the bottom wall and side wall means of the receptacle 32 in the manner illustrated in FIGURE 9.

However, the bead forming member 63 of the upper die means 47 continues to move downwardly to carry the bead forming member 86 downwardly therewith until the same reach the position illustrated in FIGURE 9 whereby the peripheral edge 96 of the blank 95 is fully received in the cooperating grooves 65 and 89 of the bead forming members 63 and 87 in the manner illustrated in FIGURE 9.

Figure 10:
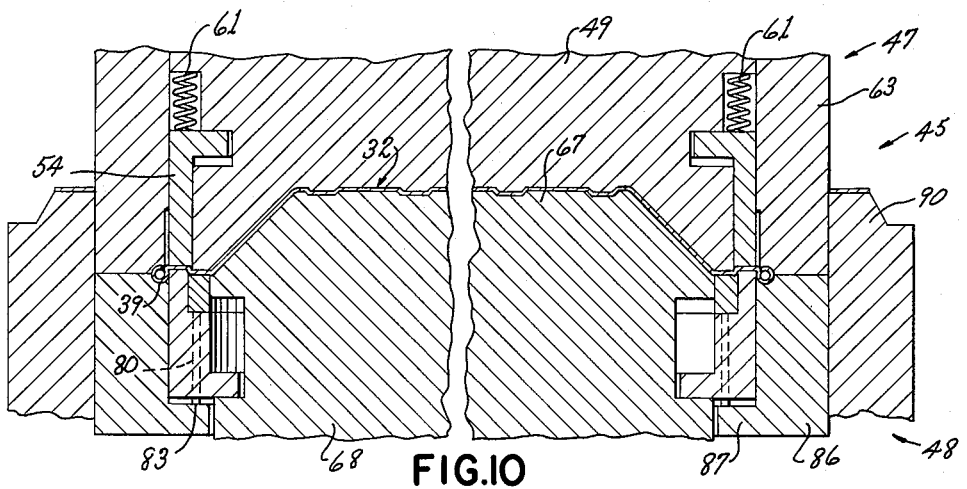
FIGURE 10 is a view similar to FIGURE 9 and illustrates the apparatus in the final receptacle forming position thereof.

Thereafter, the bead forming member 63 of the die means 47 is moved upwardly and the bead forming member 86 of the lower die means 48 is moved upwardly in unison therewith by fluid pressure means being directed into the cavity 92 in the manner previously described whereby when the bead forming member 86 has reached the position illustrated in FIGURE 10 to have the flange 87 thereof abut the free ends 83 of the push rods 80, the bead forming member 63 and 86 have completed the formation of the bead 39 for the receptacle 32.

Figure 11:
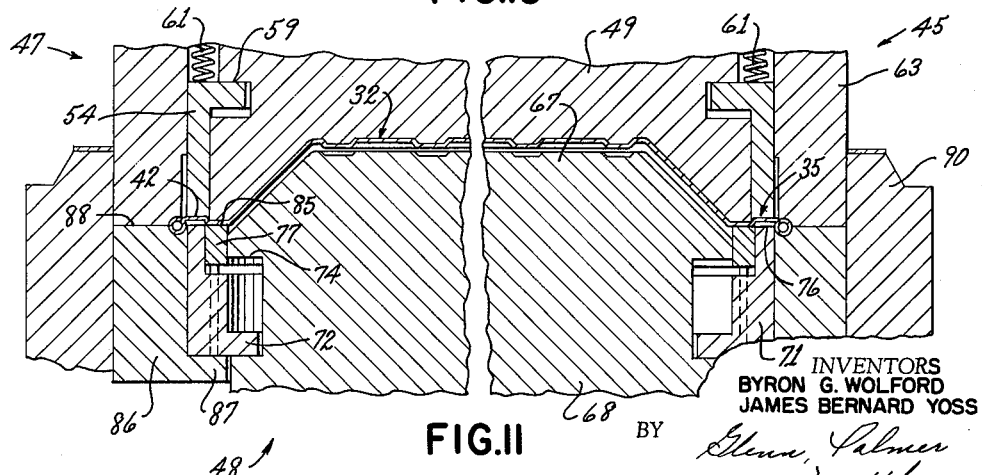
FIGURES 11–13 are views similar to FIGURE 9 and respectively illustrate how the die means of the apparatus separates from each other.

At this time, the die member 49 is moved upwardly at the same rate as the bead forming member 63 and the lower bead forming member 86 moves upwardly in unison therewith under the influence of fluid pressure in the cavity 92 to simultaneously move the die member 77 upwardly to the position illustrated in FIGURE 11 whereby the surfaces 85, 76 and 88 of the die members 77, 71 and 86 are again disposed in the same plane, whereby the completed receptacle 32 is lifted above the former 67 as illustrated in FIGURE 11.

Since the stepped portion 42 of the receptacle 32 is now raised above the forming surface 76 of the die member 71, it would seem that the force of the compression spring means 61 of the step ring 54 of the upper die means 47 would tend to ungroove the grooved portion 42 of the peripheral flange 35 of the receptacle 32.

However, it has been found that once the stepped portion 42 has been formed in the peripheral flange 35 of the receptacle 32, the spring means 61 is so slight that the same cannot remove the stepped portion 42 of the peripheral flange 35 of the receptacle 32 so that the stepped portion 42 holds the step ring 54 in its upward position against the shoulder 59 of the former 49 during the separation of the die means 47 and 48.

Figure 12:
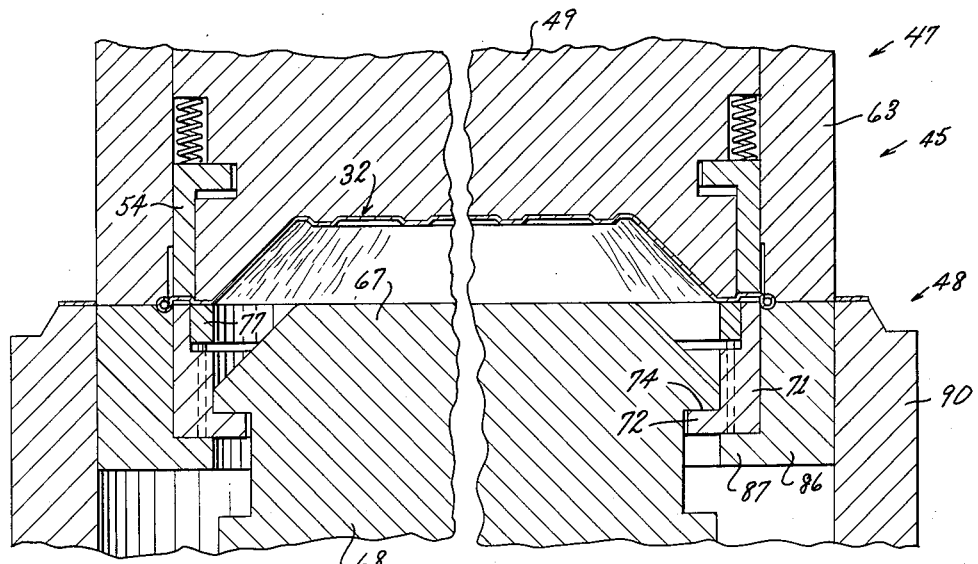

The die means 49, 54 and 63 of the upper die means 47 are continued to be moved upwardly from the position illustrated in FIGURE 11 and the die means 77, 71 and 86 of the lower die means 48 follow along in unison therewith because of the fluid pressure acting against the bottom surface of the die means 86, the flange means 87 of the die member 86 carrying the die members 71 and 77 in unison therewith until the flange 72 of the die member 71 again engages the shoulder 74 of the former 67 to terminate upward movement of the die members 77, 71 and 86 in the manner illustrated in FIGURE 12.

Figure 13:
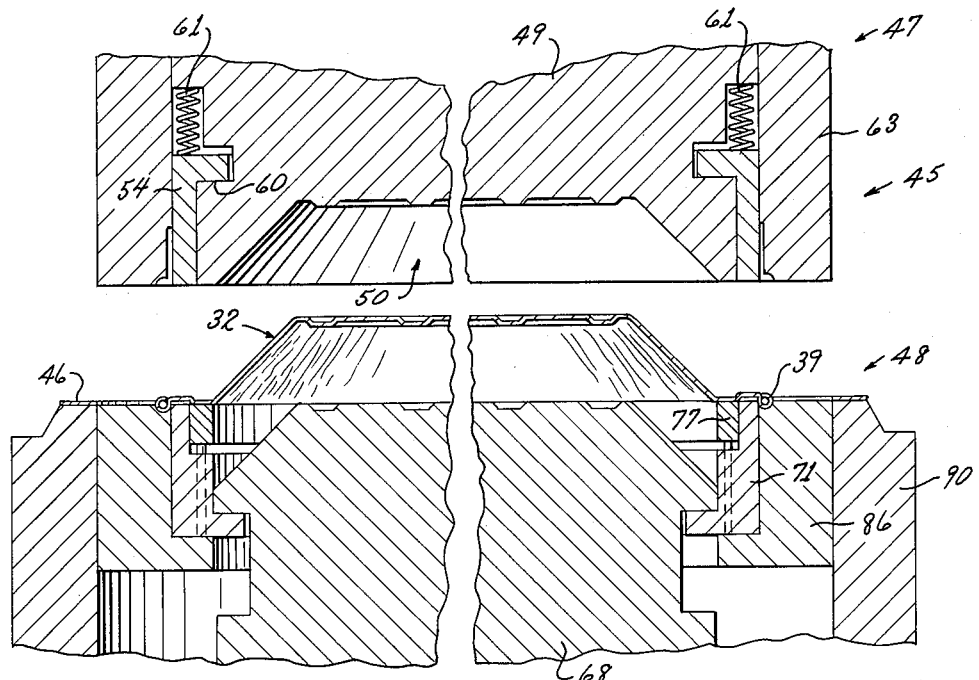

Thereafter, the die members 49, 54 and 63 of the upper die means 47 continue to move upwardly back to the position illustrated in FIGURE 7 whereby the spring means 61 now urge the die member 54 downwardly against the shoulder 60 of the former 49 to eject the receptacle 32 from the cavity 50 of the upper die means 47 whereby the ejected receptacle 32 is adapted to drop downwardly on the lower die means 48 in the manner illustrated in FIGURE 13.

With the ejected receptacle 32 disposed in the position illustrated in FIGURE 13, the same is adapted to be removed from the apparatus 45 in any suitable manner.

For example, when the blanked portion of the sheet of material 46 is again indexed inwardly into the sheet of drawings containing FIGURE 13 to bring an unblanked portion thereof between the die means 47 and 48, the same will carry the completed receptacle 32 therewith so that the same is removed from between the die means 47 and 48 whereby the die means 47 and 48 can complete another receptacle 32 in the above manner.

Therefore, it can be seen that the receptacle 32 of this invention can be formed in a relatively simple and effective manner to provide a receptacle having increased structural strength in the peripheral flanges thereof to permit the same to be readily handled by pie filling machinery and the like.

Accordingly, this invention provides an improved cup-shaped receptacle as well as an improved method and apparatus for making such a receptacle or the like.

While the form of the invention now preferred has been disclosed as required by the statutes, other forms may be used, all coming within the scope of the claims which follow.

What is claimed is:

1. A receptacle having a bottom wall means and having a side wall means interconnected to said bottom wall means and extending upwardly therefrom to define an open end of said receptacle at upper edge means of said side wall means, said side wall means having a peripheral flange extending outwardly adjacent said top edge means thereof, said peripheral flange having a groove formed therein to increase the strength of said peripheral flange, said groove defining a wide flat bottom wall that is disposed spaced from and parallel to the remainder of said flange, said peripheral flange having a curled bead at the outer end thereof, said bead being integrally interconnected and curled immediately at the outer end of said flat bottom wall.

2. A receptacle having a bottom wall means and having a side wall means interconnected to said bottom wall means and extending upwardly therefrom to define an open end of said receptacle at upper edge means of said side wall means, said side wall means having a peripheral flange extending outwardly from said top edge means thereof, said peripheral flange having an inner edge means thereof interconnected to said top edge means of said side wall means and having an outer edge means, said peripheral flange having a groove formed therein intermediate said inner and outer edge means thereof to increase the strength of said peripheral flange, said groove defining a wide flat bottom wall that is disposed spaced from and parallel to the remainder of said flange, said peripheral flange having a curled bead at the outer edge means thereof, said bead being integrally interconnected and curled immediately at the outer end of said flat bottom wall.

3. A receptacle as set forth in claim 2 wherein said groove extends from said outer edge means to a point disposed outboard of said inner edge means.

4. A receptacle as set forth in claim 2 wherein said groove forms a channel having the open end thereof facing away from said bottom wall means.

5. A receptacle as set forth in claim 2 wherein said peripheral flange is substantially horizontal.

6. A receptacle having a bottom wall means and having a side wall means interconnected to said bottom wall means and extending upwardly therefrom to define an open end of said receptacle at upper edge means of said side wall means, said side wall means having a peripheral flange extending outwardly from said top edge means thereof, said peripheral flange having an inner edge means thereof interconnected to said top edge means of said side wall means and having an outer edge means defining an annular bead, said peripheral flange having a groove formed therein intermediate said inner and outer edge means thereof to increase the strength of said peripheral flange, said groove defining a wide flat bottom wall that is disposed spaced from and parallel to the remainder of said flange, said bead having a portion thereof extending above said remainder of said flange and a portion extending below said remainder of said flange.

7. A receptacle as set forth in claim 6 wherein said groove extends from said bead to a point disposed outboard of said inner edge means.

8. A receptacle as set forth in claim 6 wherein said groove forms a channel having the open end thereof facing away from said bottom wall means.

9. A receptacle as set forth in claim 6 wherein said peripheral flange is substantially horizontal.

10. A receptacle having a bottom wall means and having a side wall means interconnected to said bottom wall means and extending upwardly therefrom to define an open end of said receptacle at upper edge means of said side wall means, said side wall means having a peripheral flange extending outwardly from said top edge means thereof, said peripheral flange having an inner edge means interconnected to said top edge means of said side wall means and having an outer edge means defining an annular bead, said peripheral flange having groove means formed therein intermediate said inner and outer edge means thereof to increase the strength of said peripheral flange, said bead having the bottom thereof substantially disposed in the same horizontal plane as the bottom of the grooved portion of said peripheral flange.

References Cited by the Examiner
UNITED STATES PATENTS

| | | | |
|---|---|---|---|
| 2,226,155 | 12/1940 | Bjornson | 229—3.5 |
| 2,269,313 | 1/1942 | Klocke | 113—51 |
| 2,602,411 | 7/1952 | Schnell | 113—46 |
| 2,735,390 | 2/1956 | Engel | 113—51 |
| 2,811,152 | 10/1957 | Wicks. | |
| 3,021,990 | 2/1962 | Duskey | 229—3.5 |
| 3,022,758 | 2/1962 | Rheingold et al. | 113—46 |
| 3,032,249 | 5/1962 | Kollar et al. | 229—3.5 |
| 3,066,824 | 12/1962 | Bestrom | 150—0.5 |
| 3,099,377 | 7/1963 | Metzler et al. | 220—74 |

JOSEPH R. LECLAIR, *Primary Examiner.*

FRANKLIN T. GARRETT, GEORGE O. RALSTON,
*Examiners.*